(12) United States Patent
Poon et al.

(10) Patent No.: US 6,815,937 B2
(45) Date of Patent: Nov. 9, 2004

(54) STEPPING INDUCTOR FOR FAST TRANSIENT RESPONSE OF SWITCHING CONVERTER

(75) Inventors: Franki Ngai Kit Poon, Hong Kong (CN); Man Hay Pong, Hong Kong (CN); Joe Chui Pong Liu, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 77 days.

(21) Appl. No.: 10/279,521

(22) Filed: Oct. 24, 2002

(65) Prior Publication Data

US 2004/0080965 A1 Apr. 29, 2004

(51) Int. Cl.[7] .................................................. G05F 1/40
(52) U.S. Cl. ....................................................... 323/282
(58) Field of Search ................................. 323/255, 271, 323/282, 340, 351

(56) References Cited

U.S. PATENT DOCUMENTS

| 5,485,076 | A | * | 1/1996 | Schoenwald et al. ....... 323/225 |
| 5,929,692 | A | * | 7/1999 | Carsten ...................... 327/531 |
| 6,188,209 | B1 | * | 2/2001 | Poon et al. ................. 323/255 |
| 6,495,993 | B2 | * | 12/2002 | Eagar ......................... 323/271 |

* cited by examiner

Primary Examiner—Adolf Berhane
(74) Attorney, Agent, or Firm—Dickstein, Shapiro, Morin & Oshinsky, LLP.

(57) ABSTRACT

A fast transient response converter is disclosed which makes use of stepping inductor in a switching converter to speed up output voltage response under fast transient condition. The inductive element in a switching converter is replaced by two series or parallel inductive elements, one of which has a smaller value of inductance than the other. During the fast transient period, the inductor with larger inductance value will be shorted to a voltage source. The total inductance will be greatly reduced and thus allows rapid current change during the transient change.

14 Claims, 11 Drawing Sheets

CONTROL CIRCUIT

CONTROL CIRCUIT

CONTROL CIRCUIT

STEPPING INDUCTOR FOR FAST TRANSIENT RESPONSE OF SWITCHING CONVERTER

1. FIELD OF THE INVENTION

This invention relates to the field of switch mode power converters, and in particular fast dynamic response of power converters.

2. BACKGROUND OF THE INVENTION

Switching converters are widely used to provide high efficiency and light weight power supply, however the transient output response to a fast load change is inherently limited by the output inductor that is present in most switching power converters. A typical prior art buck converter comprises a power stage with a plurality of switches, an inductor-capacitor filter and a feedback circuit. This feedback circuit monitors the converter output voltage and controls Pulse Width Modulation (PWM) of the switches. When there is a fast dynamic load change the response of the converter is limited by two parts of the converter, namely the feedback circuit and the power stage. The feedback circuit can be designed to be very fast by traditional linear approach or non-linear approach. However, the inherent response of the converter is limited by the output filter which is largely determined by the value of the output inductor.

Many researchers in the field have attempted to enable fast response through several different methods but all of the proposed solutions have limitations. Some researchers have attempted to speed up power converter dynamic response by using an inductor with small inductance value. This approach seemed to solve the problem because current delivery can rise much more rapidly through a small inductor. However, this approach brought on the problem of excessively high current ripple during normal operation, which introduces high root mean square current in the converter switches and passive components and this increases power loss. Other researchers have attempted to reduce losses by using parallel multiphase converters to share the current but this results in increased cost and complexity. Yet other researchers have attempted to address the problem by increasing the switching frequency. However, this introduces the problem of excessive switching losses in switches and magnetic losses in the inductor core. Additionally, high frequency operation requires high performance drive circuit which further escalates cost.

There is therefore an acute need for a method to provide fast response while maintaining a low loss level of the converter and at reduced cost for computer applications.

An invention U.S. Pat. No. 6,188,209 provides the basis for the present invention. The present invention further reduces complexity and provides alternatives to achieve fast transient response.

3. SUMMARY OF THE INVENTION

The present invention discloses different embodiments of an apparatus and a method with many salient features that provides fast transient response of switching power converters. The present invention dramatically increases the rate of change of current through an output inductor in a converter during transient while maintaining low current ripple at normal load. As it is not necessary to practice the present invention at high frequency, converter loss is kept to a minimum. However, applicant does not exclude the possibility of operating at high frequencies. The apparatus disclosed herein is operational with most power converter with an output inductor.

The basic approach of the disclosed method is to replace the inductor of a switching converter with one or more inductors with a higher inductance that operates during steady loading condition, and the capabilities to switch to one or more inductors with a lower inductance during a fast transient loading condition. This is accomplished by replacing the output inductor of a conventional buck switching converter with at least two series inductors, one of which has a small inductance, while the other has much higher inductance. The two terminals of the inductor with the higher inductance are programmed to be connected to a voltage source during transient condition. The voltage source can provide a rapid change of current in the output inductor with higher inductance while the inductor has been shorted to the voltage source. The connection to the voltage source reduces total equivalent series inductance of the two series inductor to the inductance of the inductor with small inductance, and enables high rate of change of current to the output load.

The voltage source used to short out the inductor can be any voltage in the converter, e.g. input voltage, output voltage or voltage drop of a switch or diode.

This invention produces low inductor ripple current in the steady state. In a specific embodinemt, during steady state operation, the equivalent series inductance of the series inductors is the summation of the two inductors. The inductor with high inductance is designed to be large enough to maintain very small ripple current to minimize the root mean square (RMS) current flowing through the switching elements and other components. The inductor with small inductance is designed to be small enough to provide necessary rate of change of current when the inductor with higher inductance is shorted out by a voltage source during transient condition. The transient conditions only exist for a short period of time and a converter spends most of its operating time in the steady state. Hence the converter will carry high ripple current only for a short duration of time and efficiency will not be seriously impaired. This invention is versatile and can be applied to most switching converters with output inductor.

In an alternative embodiment, two parallel inductors, one of which has a high inductance and the other having a much lower inductance, can also be employed similar to the description above, in providing large inductance during steady loading condition and switch to lower inductance during fast transient load change.

Accordingly, it is an object of the present invention to provide fast dynamic response to switching power converters.

It is another object of the present invention to maintain low output inductor ripple current.

It is another object of the present invention to improve converter dynamic response without operating at very high frequency.

It is another object of the present invention to maintain high converter efficiency.

It is another object of the present invention to use a simple control method.

These and other objects of the present invention will become apparent to those skilled in the art from the following detailed description of the invention and from the accompanying drawings.

4. BRIEF DESCRIPTION OF DRAWINGS

5. DETAILED DESCRIPTION OF THE PREFERRED EMBODIMENTS

Figure 1:
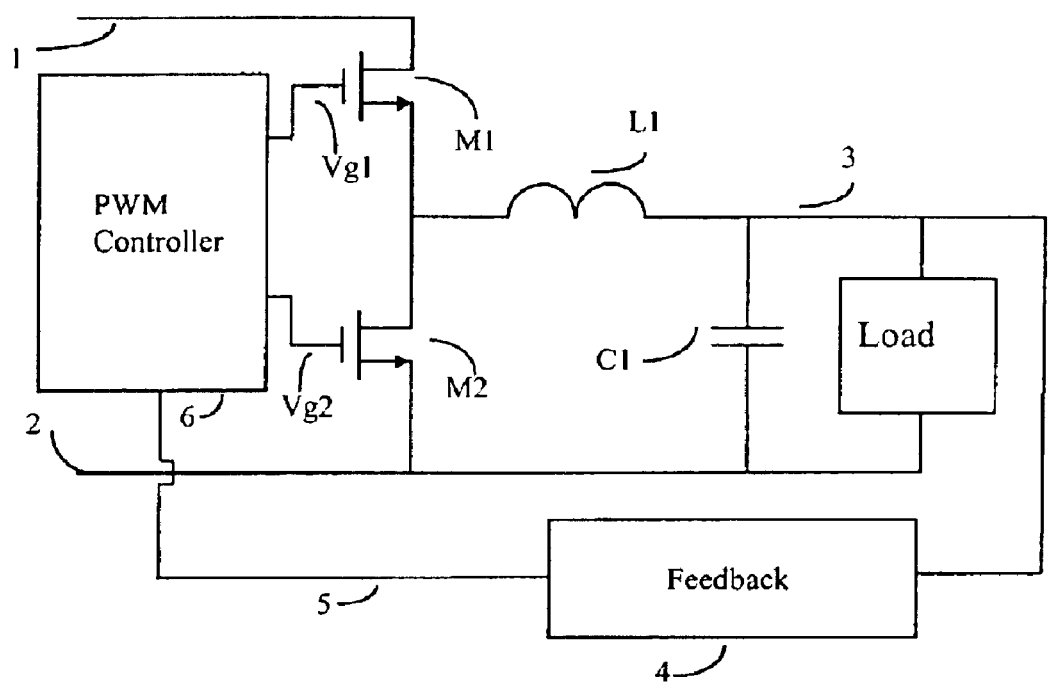
FIG. 1 (Prior Art) illustrates a simplified equivalent circuit of a prior art Buck converter.
Figure 2:
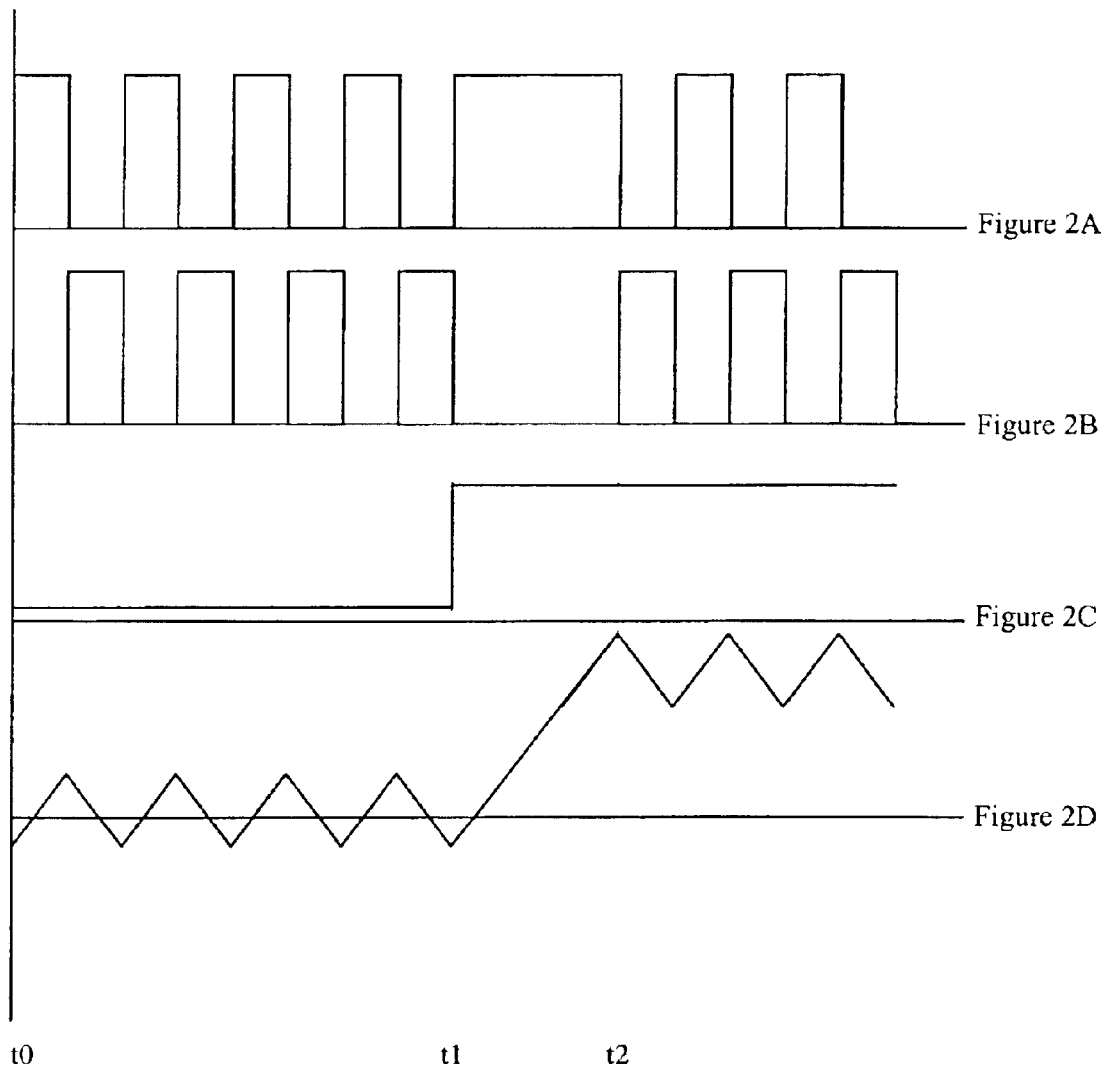
FIGS. 2A–2D illustrate a waveform diagram during a load transient for the prior art Buck converter shown in FIG. 1.

The detail descriptions of the present invention have been given in relation to the prior art buck converter. However, it is obvious to one of skill in the art that the present invention is not limited to buck converters but can also be applied to other converters. FIG. 1 illustrates a prior art buck converter with two switches and an output inductor capacitor filter. FIG. 2 illustrates that when there is a step-like rise in load current, as illustrated in FIG. 2C, assuming the feedback circuit 4 and the Pulse Width Modulation controller 6 illustrated in FIG. 1, are fast enough to change the duty cycles of the converter switches to enable the inductor current to rise to a new average (FIG. 2D). The rate of increase of the current is still limited by the inductance of the output inductor. A small inductance would allow a fast rate of change of current but the converter still suffers from a high ripple inductor current. A large inductance would reduce ripple current but the inductor current will change slowly. The present invention provides several novel embodiments that tackle this problem of allowing fast inductor current rate changes while at the same time providing a way of reducing the ripple current.

First Embodiment

Figure 3:
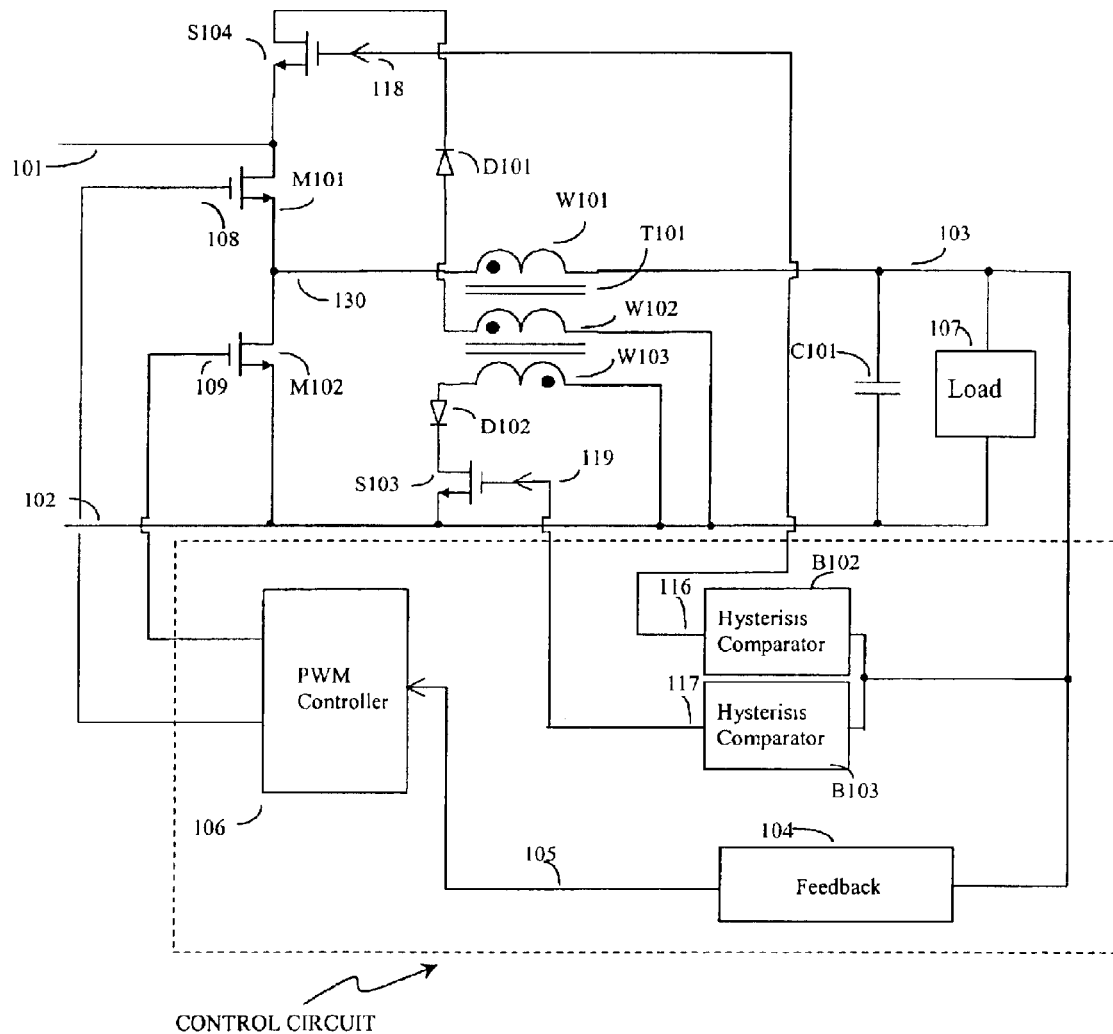
FIG. 3 illustrates the basic operation of a first embodiment of the present invention.

FIG. 3 illustrates basic the circuit of the first embodiment of the invention, which comprises a power circuit and a control circuit. The power circuit comprises a pair of input terminals 101 and 102 for connection to a DC voltage source. It further comprises a pair of switches, represented by MOSFETs M101 and M102, which produce a series of alternating voltage pulses at node 130. This pair of switches is coupled to a transformer T101, which comprising windings W101, W102 and W103, and an output capacitor C101, as indicated in FIG. 3. A load is connected to the output capacitor C101. Winding W101 is coupled directly to capacitor C101. Winding W102 is coupled to the input voltage source and the voltage produced by the voltage drop of the MOSFET S104 and diode D101. Winding W103 is coupled to an input voltage source and the voltage source produced by the voltage drop of the MOSFET S103 and diode D102. Two MOSFETs S103 and S104 control the connection of voltage source across windings W103 and W102 respectively. Two diodes D101 and D102 block the reverse voltage across the MOSFETs S103 and S104 and the diodes also provide additional voltage.

Most power devices attached to the converter are low voltage devices. MOSFET S104 will sustain a lower voltage at turn off, which is equal to the difference between the input voltage and the voltage generated by winding W102, when MOSFET M101 is turned on. MOSFET S103 also sustain a lower voltage at turn off, as the voltage across winding W103 is determined by the winding ratio and output voltage, and the output voltage is always lower than the input voltage when MOSFET M102 is turned on. Hence a low voltage MOSFET can be used. Similarly diode D101 sustain a lower reverse voltage, as the voltage across winding W102 is determined by the winding ratio and output voltage and the output voltage is always lower than input voltage, when MOSFET M102 is turn on. Diode D102 sustain a lower reverse voltage, as no extra voltage source is added to increase the reverse voltage, when MOSFET M101 is turned on. All these additional low voltage devices will therefore not increase product cost significantly.

The control circuit of the first embodiment comprises a feedback block 104, which is then coupled to a Pulse Width Modulation (PWM) block 106, and which provides driving pulses to the switches in the power circuit. A plurality of pulses are then produced between node 130 and node 102. The plurality of pulses will then be filtered by inductance across winding W101 and output capacitor C101 to produce a regulated DC output.

The feedback block monitors converter load voltage and the PWM block drives the power switches M101 and M102 in a closed loop. There are a plurality of apparatuses which form a second loop which monitors converter load voltage and produce driving signals for switches S103 and S104 in the power circuit. These apparatus comprise two hysteresis comparators B102 and B103 which form a sensing circuit to monitor converter load voltage, and are coupled to switches S104 and S103 respectively.

During operation, feedback block 104 monitors the converter output voltage and generates signal to control the PWM controller 106, which in turn generates gate pulses to drive MOSFETs M101 and M102 and maintains a steady output voltage across the load 107. During steady state operation, the two switches S103 and S104 are opened, hence the inductance of W101 provides high inductance to keep the ripple current low.

Figure 4:
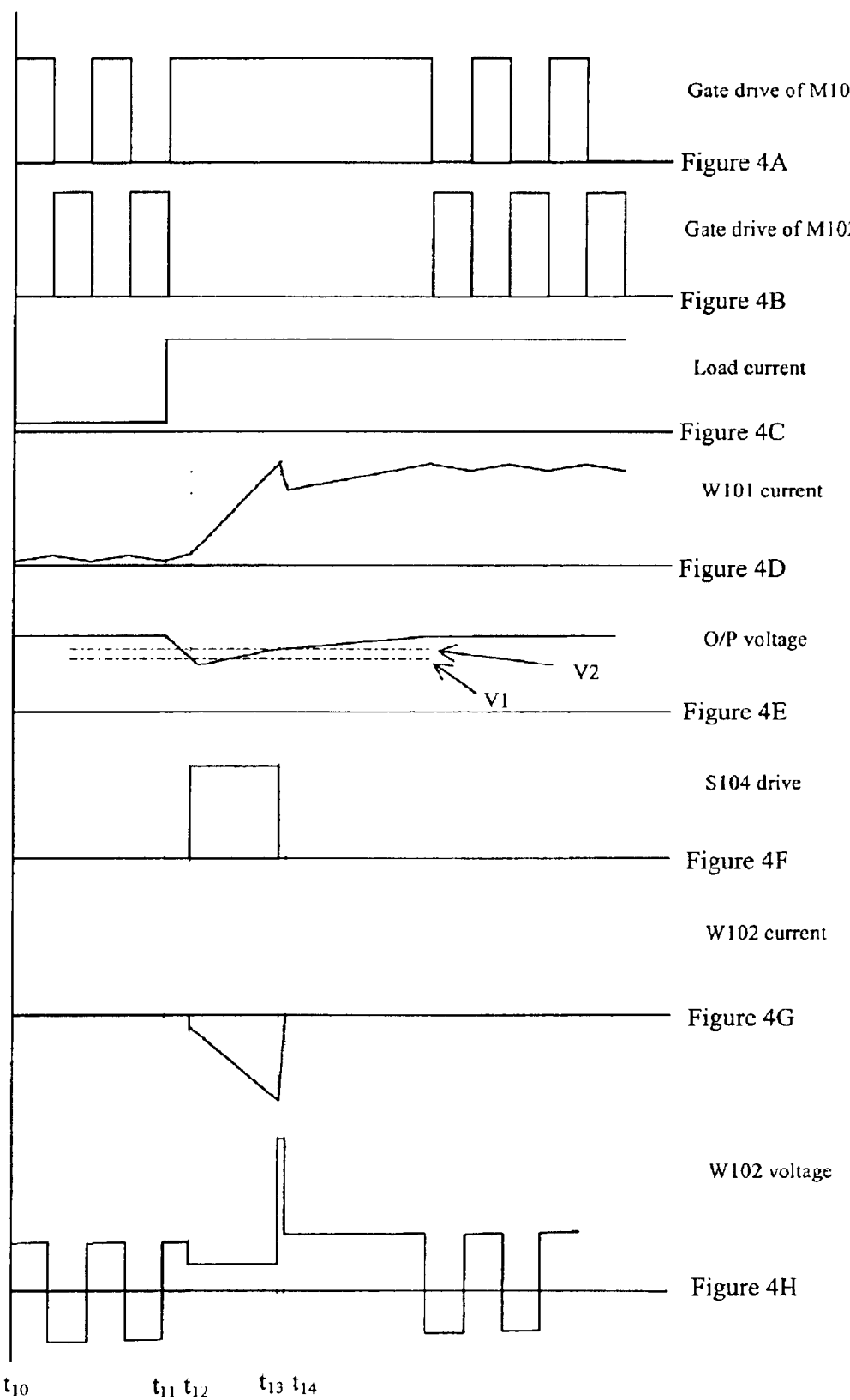
FIG. 4 illustrate waveforms for the first embodiment of the present invention during transient load current increase.

The waveforms of FIG. 4 illustrate the operation of the present invention when there is a fast transient increase in load current. In the period between t10 and t11 the converter operates in steady state. At time t11 there is a step increase in load current as illustrated in FIG. 4C. This leads to output voltage drop as illustrated in FIG. 4E. When the voltage drops below a threshold level V1 switch S104 is switched on by the apparatus B102. Inductance of winding W101 diminishes and the equivalent inductance drops to the level of leakage inductance. This enables current to rises rapidly as illustrated in FIG. 4D. In the time period between t12 and t13 current flows through winding W102 as well. This current consists of the reflected current from winding W101 and magnetizing current which is energized by the input voltage source. The magnitude of this current is dependent on the ratio of the number of turns of windings W101 and W102. In this time period the magnetizing current of transformer T101 increases as a result of the imposed input voltage across winding W102. The increase in current raises the output voltage until it reaches a second voltage level V2 at time t13 and switch S104 is turned off.

The input voltage source is not necessarily the only voltage to be applied across winding W102 or W103 during transient loading condition, and any voltage source found in the converter can be used, e.g. the voltage drop across the switches S104 or S103.

The output voltage recovers and reaches a preset reference V2. At time t13 switch S104 is turned off and current through winding W102 falls to zero during the time period t13 to t14. When switch S104 is turned off the magnetizing current of transformer T101 will be coupled to winding W101. At time t13, the current through the leakage inductor of T101 and the magnetizing current through W101 are not necessarily the same. The difference in current will charge up the stray capacitance of switch S104 and create a voltage spike in the time period t13 to t14 as illustrated in FIG. 4H. An energy absorption circuit, such as a snubber circuit, can be employed to avoid overvoltage in winding W101. Such energy absorption circuit may be coupled to winding W103, W102, transformer T101, switch S103 or switch S104.

After the fast transient, the converter resumes normal operation quickly. The current through winding W102 drops to zero at time t14. Beyond time t14 the equivalent series output inductance resumes the inductance of W101. The output inductor current now changes at a smaller slope. If the inductor current matches with the required load current, the output voltage will rise until feedback circuit 104 operates to resume normal pulse width modulation. However, there is a chance that the inductor current at time t14 falls short of the required load current and the output voltage falls after switch S104 is turned off at t14. In this event, the voltage level may fall back to the level V1 and the whole process of triggering switch S104 on will repeat. If S104 is triggered on again the inductor current through W101 will rise until it is sufficient to maintain the load current. Hence the output voltage will eventually rise to a level which resumes normal pulse width modulation.

Figure 5:
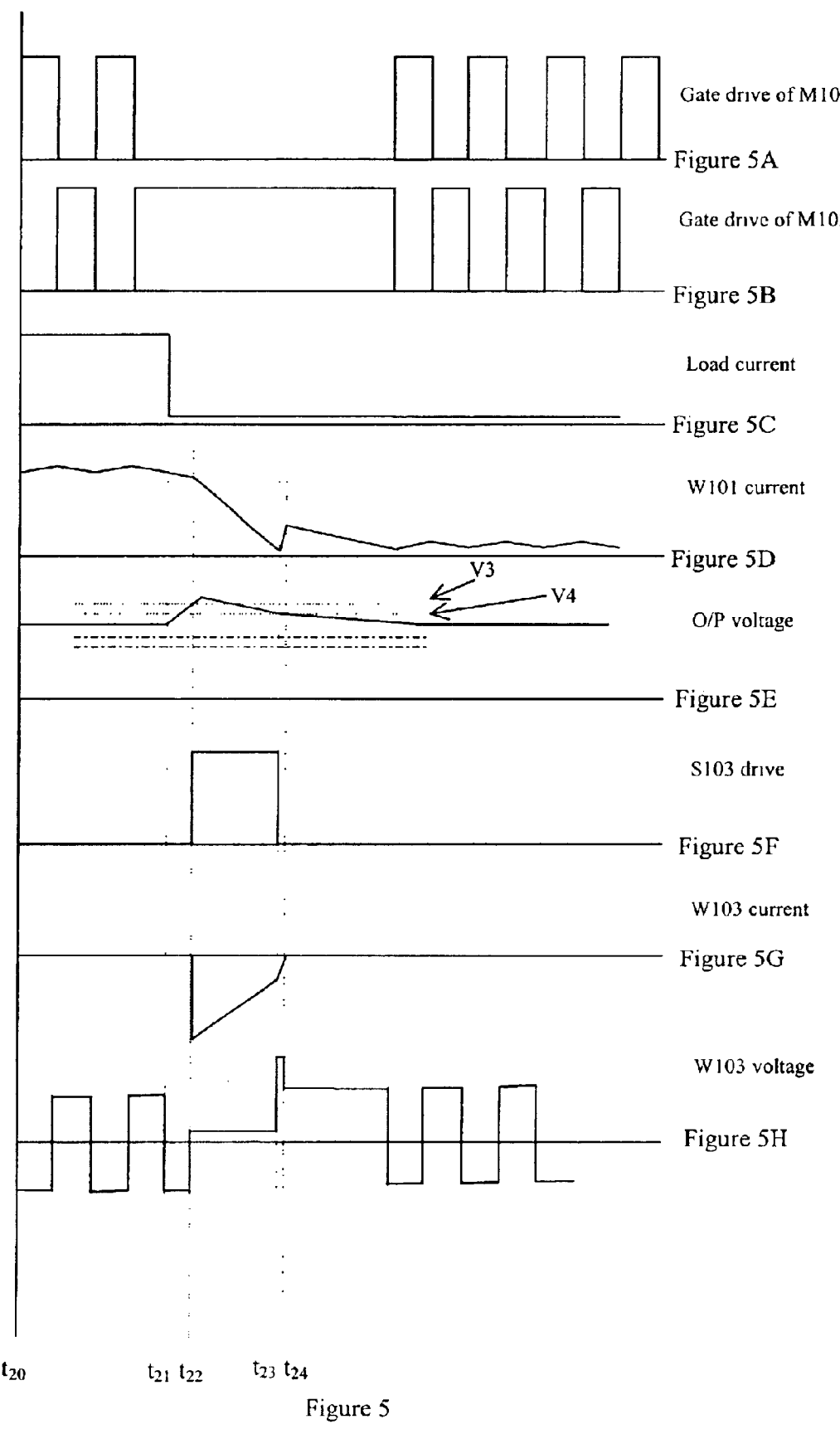
FIG. 5 illustrate waveforms for the first embodiment of the present invention during transient load current decrease.

The waveforms of FIG. 5 illustrate the operation of the present invention when there is a fast transient decrease in load current. In the time period t20 to t21 the converter operates with steady load current. At time t21 the load current experiences a step-like decrease as illustrated in FIG. 5C. This causes an increase in output voltage, as illustrated in FIG. 5E. Assuming that feedback circuit 104 and PWM controller 106 are fast enough to turn off MOSFET M101 and turn on MOSFET M102, the current reduction in W101 is still slow because of the high inductance of W101. At time t22, the output voltage reaches a level V3 which triggers switch S103 to turn on through B103. Effectively winding W103 is shorted by switch S103 and D102, the inductance of W101 disappears and the rapid decrease in current is taken up by the current in winding W103. A magnetizing current is also established in winding W103, caused by the voltage drop of switch S103 and D102. As a result of the reduction in current, the output voltage decreases until it reaches another voltage level V4 at time t23. This triggers switch S103 and the magnetizing current is transferred to winding W101. This magnetizing current does not necessarily match the current flow in leakage inductor. This will cause a voltage spike across winding W103 in the time period t23 to t24 as illustrated in FIG. 5H. An energy absorption circuit, such as a snubber circuit, can be employed to avoid overvoltage in winding W101. Such energy absorption circuit may be coupled to inductor W103, W102, transformer T101, switch S103 or switch S104.

In the time period after t24, the output voltage gradually reduces to an appropriate level such that the normal feedback loop and PWM controller resume normal operation. However, there is still a possibility that current through the leakage inductor L101 has not sufficiently decreased to prevent the output voltage from reaching voltage threshold level V3 after time t24. In this case the output voltage will eventually hit voltage triggering level V3 and the process will repeat until the output voltage reaches a steady state.

The present invention provides means to keep the output voltage of the converter within certain limits and is able to provide fast transient response against sudden load current changes.

Second Embodiment

Figure 6:
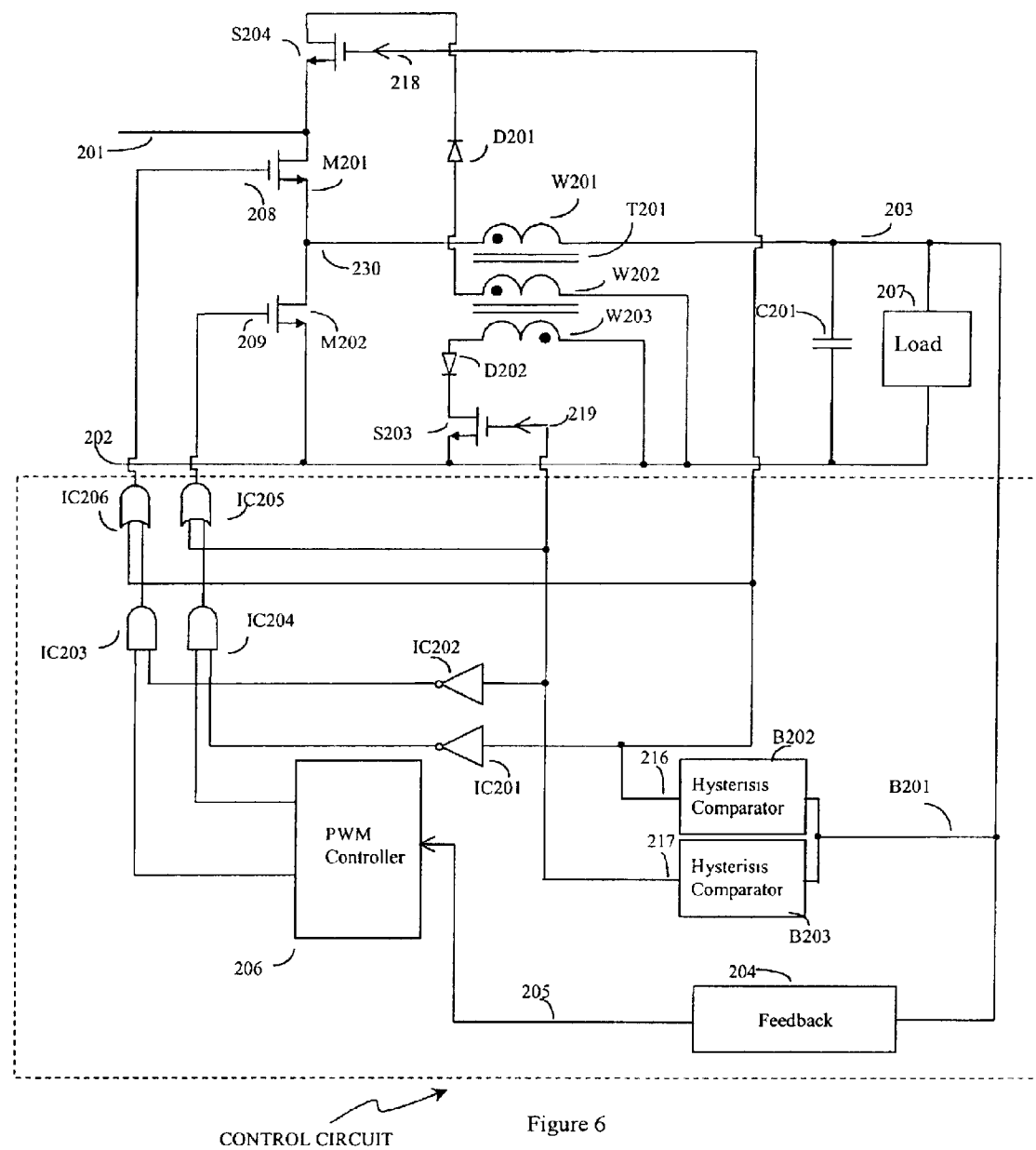
FIG. 6 illustrates a second embodiment of the present invention.

FIG. 6 illustrates a second embodiment of the present invention, which synchronizes the switch on and switch off time of switches M201, N202, S203 and S204, in order to achieve faster response. This embodiment also comprises a power circuit and a control circuit, similar to the first embodiment.

The power circuit comprises a pair of input terminals 201 and 202 for connection to a DC voltage source, and further comprises a pair of switches, represented by MOSFETs M201 and M202, which produces a series of alternating voltage pulses at node 230. This pair of switches is coupled to a transformer T201, which comprises windings W201, W202 and W203, and an output capacitor C201, as indicated in FIG. 6. A load is connected to the output capacitor C201, and winding W201 is coupled directly to capacitor C201. Windings W202 is coupled to a input voltage source and the voltage source caused by the voltage drop of the MOSFET S204 and diode D201. Windings W203 is coupled to the voltage source caused by the voltage drop of the MOSFET S203 and diode D202. Two MOSFETs S203 and S204 control the connection of voltage source across windings W203 and W202 respectively. Two diodes D201 and D202 block the reverse voltage across the MOSFETs S203 and S204 and the diodes also provide an alternative voltage source to short the windings.

Most devices attached to the power converter are low voltage devices. MOSFET S204 will sustain a lower voltage than the input at turn off, which is equal to the difference between the input voltage and the voltage generated by winding W202 when MOSFET M201 is turn on. MOSFET S203 also sustains a lower voltage at turn off, as the voltage across winding W203 is determined by the ratio of the winding and the output voltage is always lower than input voltage, when MOSFET M202 is turn on. Hence a low voltage MOSFET can be used. Similarly diode D201 sustains a lower reverse voltage, as the voltage across winding W202 is determined by the winding ratio and the output voltage, and the output voltage is always lower than input voltage when MOSFET M202 is turn on. Diode D202 sustain a lower reverse voltage, as no extra voltage source is added to increase the reverse voltage, when MOSFET M201 is turn on. As these are all low voltage devices, they will not significantly increase product cost.

The control circuit of the second embodiment comprises a feedback block 204, which is then coupled to a Pulse Width Modulation (PWM) block 206, which provides driving pulses to the switches in the power circuit. A plurality of pulses is then produced between node 230 and node 202. The plurality of pulses will then be filtered by inductance across winding W201 and output capacitor C201 to produce a regulated DC output.

The feedback block monitors converter load voltage and the PWM block drives the power switches M201 and M202 in a closed loop. There are a plurality of apparatuses which form a second loop, which monitors converter load voltage, and produce driving signals for switches S203 and S204 in the power circuit. These apparatuses comprise two hysteresis comparators B202 and B203 which form a sensing circuit to monitor converter load voltage. These comparators are coupled switches S204 and S203 respectively.

In order to give the fastest transient response of the converter, a logic circuit comprising IC201, IC202, IC203, IC204, IC205 and IC206 is present to ensure that MOSFET M201 turns on under any condition when auxiliary switch S204 is triggered by B202 to turn on. This overrides the slower feedback circuit 204 and PWM controller 206. The logic circuit ensures MOSFET M202 turns on under any condition when auxiliary switch S203 is triggered by B203 to turn on. If both S203 and S204 are not triggered by B203 and B202, MOSFETs M201 and MOSFET M202 will be driven by the signal from the PWM controller 206.

The steady state and transient operation of this embodiment is the same as that of the first embodiment. Appropriate turns ratios of windings in transformer T201 are used.

Third Embodiment

Figure 7:
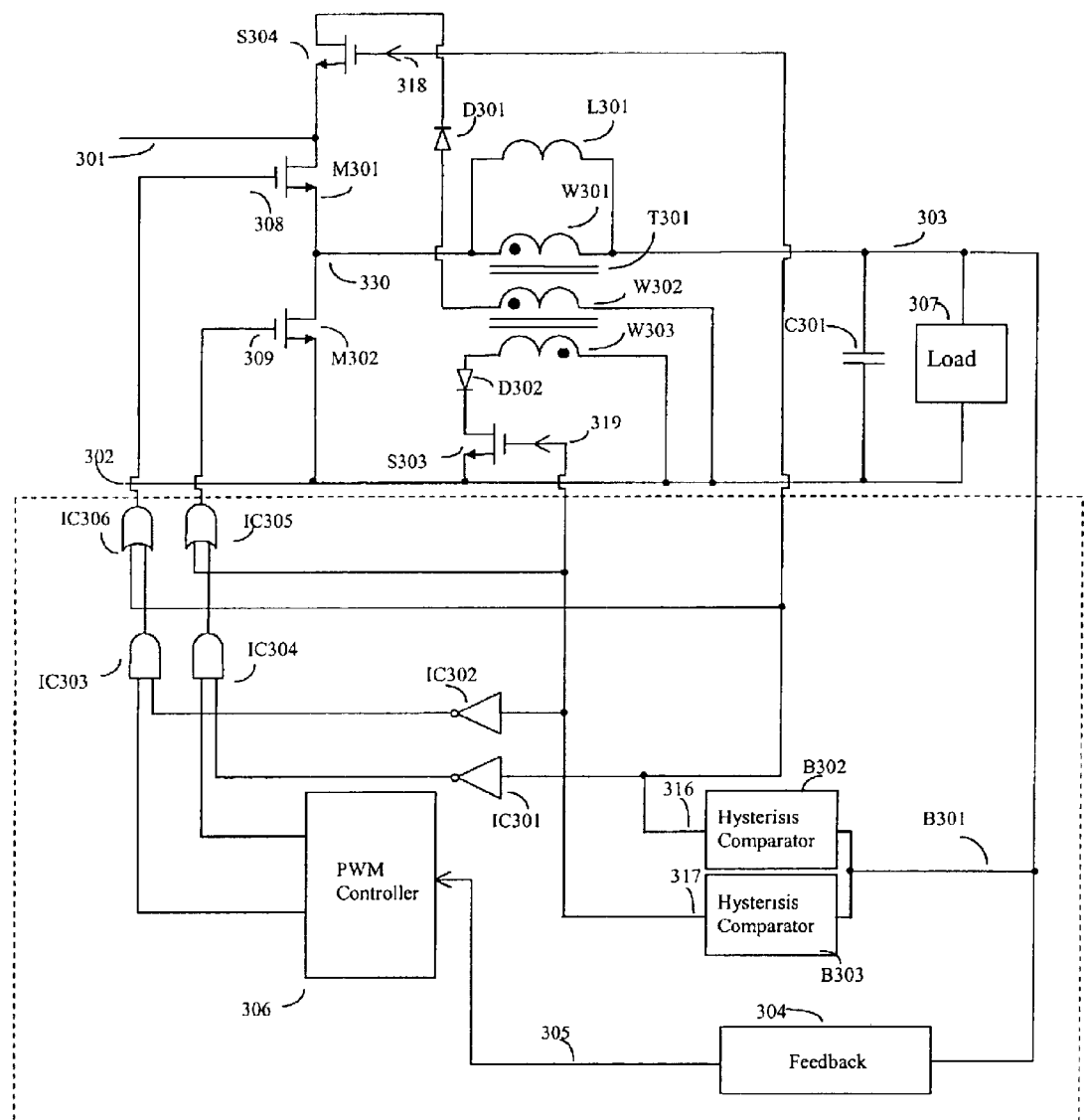
FIG. 7 illustrates a third embodiment of the present invention.

FIG. 7 illustrates a third embodiment of the present invention, which eliminates the need for the transformer to carry both the steady state output current and transient current. The steady state current is handled by a parallel inductor while the transient current is handled by a separate transformer. This increases the flexibility for the construction of the inductor and allows better control of parameters. This embodiment also comprises a power circuit and a control circuit similar to the first embodiment.

The power circuit comprises a pair of input terminals 301 and 302 for connection to a DC voltage source, and further comprises a pair of switches, represented by MOSFETs M301 and M302, which produces a series of alternating voltage pulses at node 330. This pair of switches is coupled to a transformer T301, which comprises windings W301, W302 and W303, and an output capacitor C301, as illustrated in FIG. 7. A load is connected to the output capacitor C301, and winding W301 and inductor L301 are coupled directly to capacitor C301. Winding W302 is coupled to an input voltage source and the voltage produced by the voltage drop of the MOSFET S304 and diode D301. Winding W303 is coupled to the voltage source produced by the voltage drop of the MOSFET S303 and diode D302. Two MOSFETs S303 and S304 control the connection of voltage source across windings W303 and W302 respectively. Two diodes D301 and D302 block the reverse voltage across the MOSFETs S303 and S304 and the diodes also provide an alternative voltage source to short the windings.

Most power devices attached to the converter are low voltage devices. MOSFET S304 will sustain a lower voltage at turn off, which is equal to the difference between the input voltage and the voltage generated by winding W302, when MOSFET M301 is turned on. MOSFET S303 also sustain a lower voltage at turn off, as the voltage across winding W303 is determined by the winding ratio and output voltage, and the output voltage is always lower than input voltage when MOSFET M302 is turn on. Hence a low voltage of the MOSFET can be used. Similarly diode D301 sustain a lower reverse voltage, as the voltage across winding W302 is determined by the winding ratio and output voltage and the output voltage is always lower than input voltage, when MOSFET M302 is turn on. Diode D302 sustain a lower reverse voltage, as no extra voltage source is added to increase the reverse voltage, when MOSFET M301 is turn on. These are all low voltage devices, which will not significantly increase production costs.

The control circuit comprises a feedback block 304 which is then coupled to a Pulse Width Modulation (PWM) block 306, which provides driving pulses to the switches in the power circuit. A plurality of pulses is then formed between node 330 and node 302. The plurality of pulse will then be filtered by the inductance across inductor L301 and output capacitor C301 to form a regulated DC output.

The feedback block monitors converter load voltage and the PWM block 306 drives the power switches M301 and M302 in a closed loop manner. There are a plurality of apparatuses which form a second loop, which monitors converter load voltage, and produce driving signals for switches S303 and S304 in the power circuit. These apparatuses comprise two hysteresis comparators B302 and B303 which form a sensing circuit to monitor converter load voltage. These comparators are coupled to switches S304 and S303 respectively.

In order to give the fastest transient response of the converter, a logic circuit comprising IC301, IC302, IC303, IC304, IC305 and IC306, ensures MOSFET M301 turns on under any condition when auxiliary switch S304 is triggered by B302 to turn on, or to ensure MOSFET M302 turns on under any condition when auxiliary switch S303 is triggered by B303 to turn on. If both S303 and S304 are not triggered by B303 and B302, MOSFETs M301 and MOSFET M302 will be driven by the signal from the PWM controller 306.

The operation of this embodiment is the same as that of the second embodiment, except that the steady state output current flows in an external inductor L301, rather than in the magnetizing inductance, as in winding W303. Hence the transformer T301 can be made smaller, as it is used in transient loading condition. Appropriate turns ratio of windings in transformer T301 are used.

Inductor L301 can be made of one single winding on a magnetic component, or it can be a combination of several individual smaller inductors in parallel or in series for ease of making under high current application.

Fourth Embodiment

Figure 8:
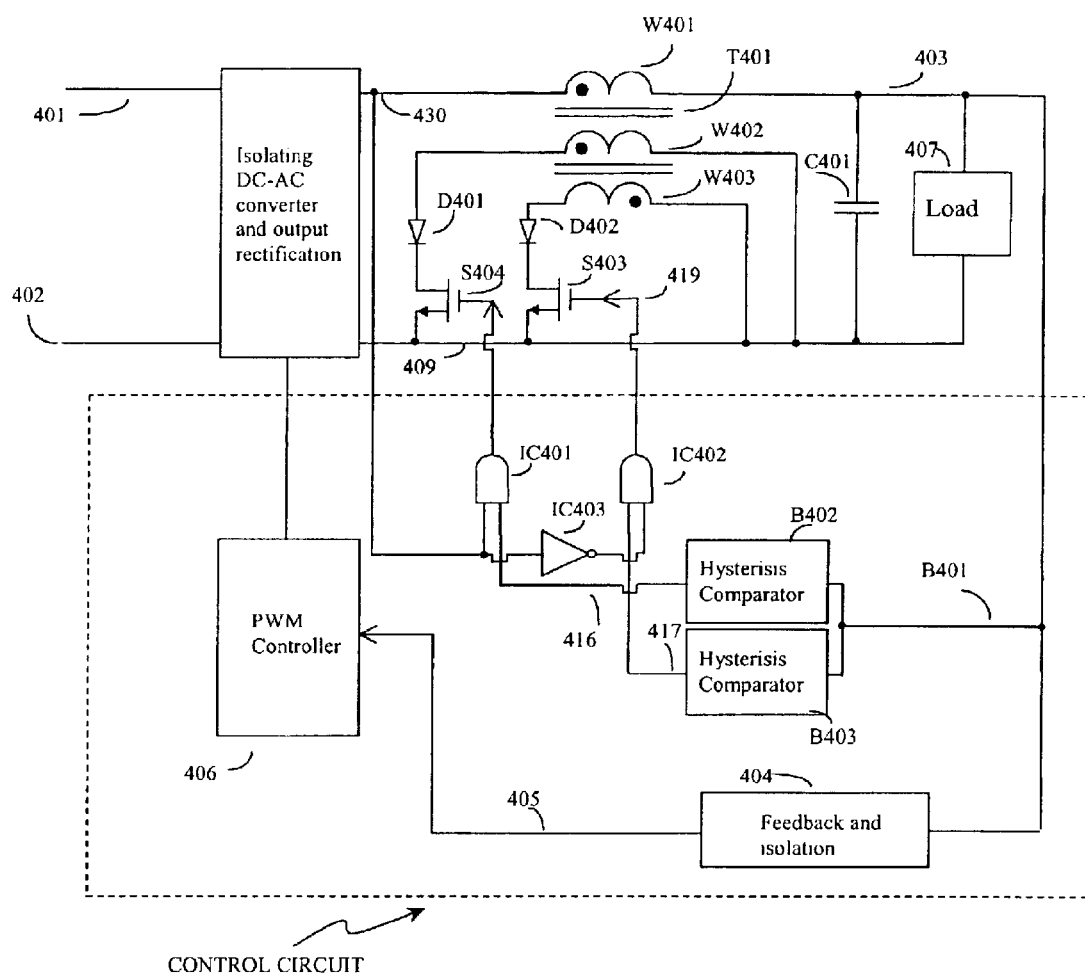
FIG. 8 illustrates an isolated converter of the fourth embodiment of the present invention.

The present invention can also be applied to isolated power converters. A fourth isolated converter embodiment of the present invention is illustrated in FIG. 8. A plurality of pulses comes from the output winding and its corresponding rectification circuit. This embodiment is somewhat similar to the previously presented embodiments, in that it comprises a power circuit and a control circuit. However, it further comprises an isolation and rectification circuit.

The power circuit comprises a pair of input terminals 401 and 402 for connection to an isolating DC-AC converter and output rectification unit. The output of the isolating DC-AC converter and output rectification unit is connected across node 430 and node 409, and produces a series of alternating voltage pulses at node 430. This plurality of pulses is coupled to a transformer T401, which comprises windings W401, W402 and W403, and an output capacitor C401, as indicated in FIG. 8. A load is connected to the output capacitor C401, and winding W401 is coupled directly to capacitor C401. Windings W402 is coupled to a voltage produced by the voltage drop of the MOSFET S404 and diode D401. Windings W403 is coupled to a input voltage source and the voltage source caused by the voltage drop of the MOSFET S403 and diode D402. Two MOSFETs S403 and S404 control the connection of voltage source across windings W403 and W402 respectively. Two diodes D401 and D402 block the reverse voltage across the MOSFETs S403 and S404 and the diodes also provide an alternative voltage source to short the windings.

The control circuit comprises a feedback block 404 which is then coupled to a Pulse Width Modulation (PWM) block 406 which provides driving pulses to the switches in the power circuit. A plurality of pulses is then formed between node 430 and node 402. The plurality of pulses will then be filtered by inductance across winding W401 and output capacitor C401 to form a regulated DC output.

The feedback and isolation block 404 monitors converter load voltage and the PWM block 406 giving signal to control the duty cycle generated at node 430. There are a plurality of apparatuses which form a second loop, which monitors converter load voltage and produce driving signals for switches S403 and S404 in the power circuit. These apparatuses comprise two hysteresis comparators B402 and B403 which form a sensing circuit to monitor converter load voltage. These comparators are coupled switches S404 and S403 respectively.

This converter does not have a steady voltage source, therefore appropriate control has to be applied. In order to provide the fastest transient response of the converter, a logic circuit comprising IC401, IC402, and IC403, ensures auxiliary switch S404 is triggered by B402 to turn on when the pulse voltage at node 430 is high, or to ensure auxiliary switch S403 is triggered by B403 to turn on when the pulse voltage at node 430 is low.

The operation of this embodiment is the same as that of the second embodiment except the plurality of pulse at node 430 is not generated by the series MOSFETs but from the isolating DC-AC converter and output rectification.

Fifth Embodiment

Figure 9:
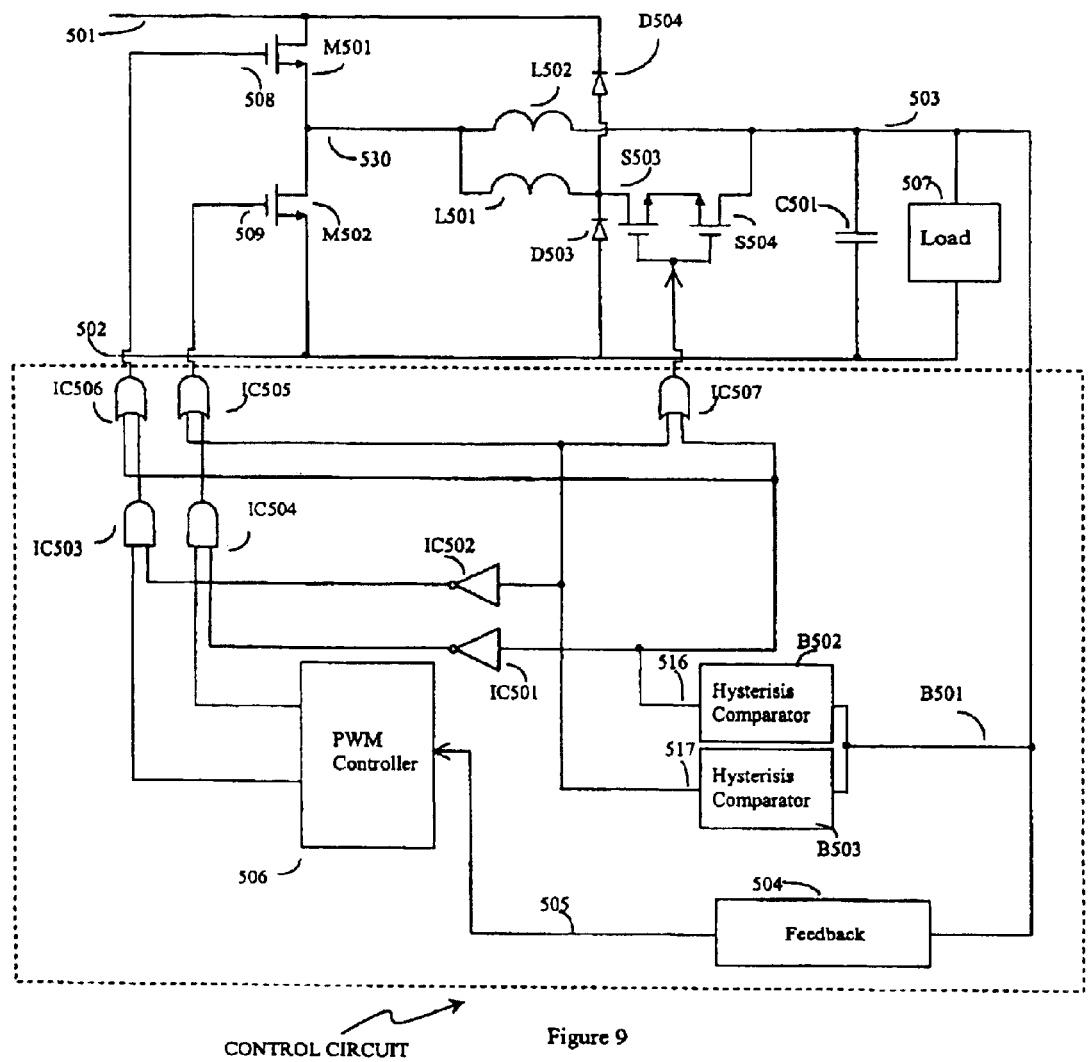
FIG. 9 illustrates a fifth embodiment of the present invention.

A fifth embodiment of the present invention is illustrated in FIG. 9. In this embodiment the principle of stepping inductance is different from all of the aforementioned embodiments. A small inductor and a large inductor are arranged in parallel and a switch is connected in series with the small inductor. The switch is normally open to isolate the small inductor. When there is a transient change in load voltage the switch is closed to connect the small inductor in parallel with the large inductor and enables fast current change. FIG. 9 illustrates this embodiment, which also comprises a power circuit and a control circuit.

The power circuit comprises a pair of input terminals 501 and 502 for connection to a DC voltage source, and further comprises switches, represented by MOSFETs M501 and M502, which produces a series of alternating voltage pulses. This pair of switches is coupled to an inductor L502 which is further coupled to an output capacitor C501 as indicated in FIG. 9. An inductor L501 with a series switch made up of two series unidirectional switches S503 and S504 are coupled in parallel with inductor L502. Two diodes D503 and D504 are coupled to the node connecting switch S503, S504 and inductor L501 for voltage clamping purpose and protection of switches S503, S504. A load is connected to the output terminals attached to output capacitor C501.

The control circuit comprises a feedback block 504, which is then coupled to a Pulse Width Modulation (PWM) block 506, which provides driving pulses to the switches in the power circuit. The feedback block monitors converter load voltage and the PWM block 506 drives the power switches M501 and M502 in a closed loop manner. There are a plurality of apparatuses which form a second loop, which monitors converter load voltage, and produce driving signals for switches S503, S504 in the power circuit. These apparatuses comprise a high pass filter B501 which monitors converter load voltage and is coupled to two hysteresis comparators B502 and B503. These comparators are coupled to AND gates IC504 and IC 503. Driving signals for MOSFETs M501 and M502 are also input signals to these AND gates. The outputs of these AND gates are fed into an OR gate IC505 which drives switch S503 on and off accordingly.

The steady state operation is explained. Feedback block 504 generates a signal to control the PWM controller 506, which generates gate pulses to drive MOSFETs M501 and M502 and maintains a steady voltage across the load 507. The operation is the same as that of a conventional converter with an output inductor L502 and output capacitor C501. During steady state operation, switches S503, S504 are open so that inductor L501 is not involved in power conversion. Inductor L502 has inductance high enough to suppress excessive ripple current. This maintains high efficiency during steady load condition. Inductor L501 has inductance considerably smaller than that of inductor L502.

Figure 10:
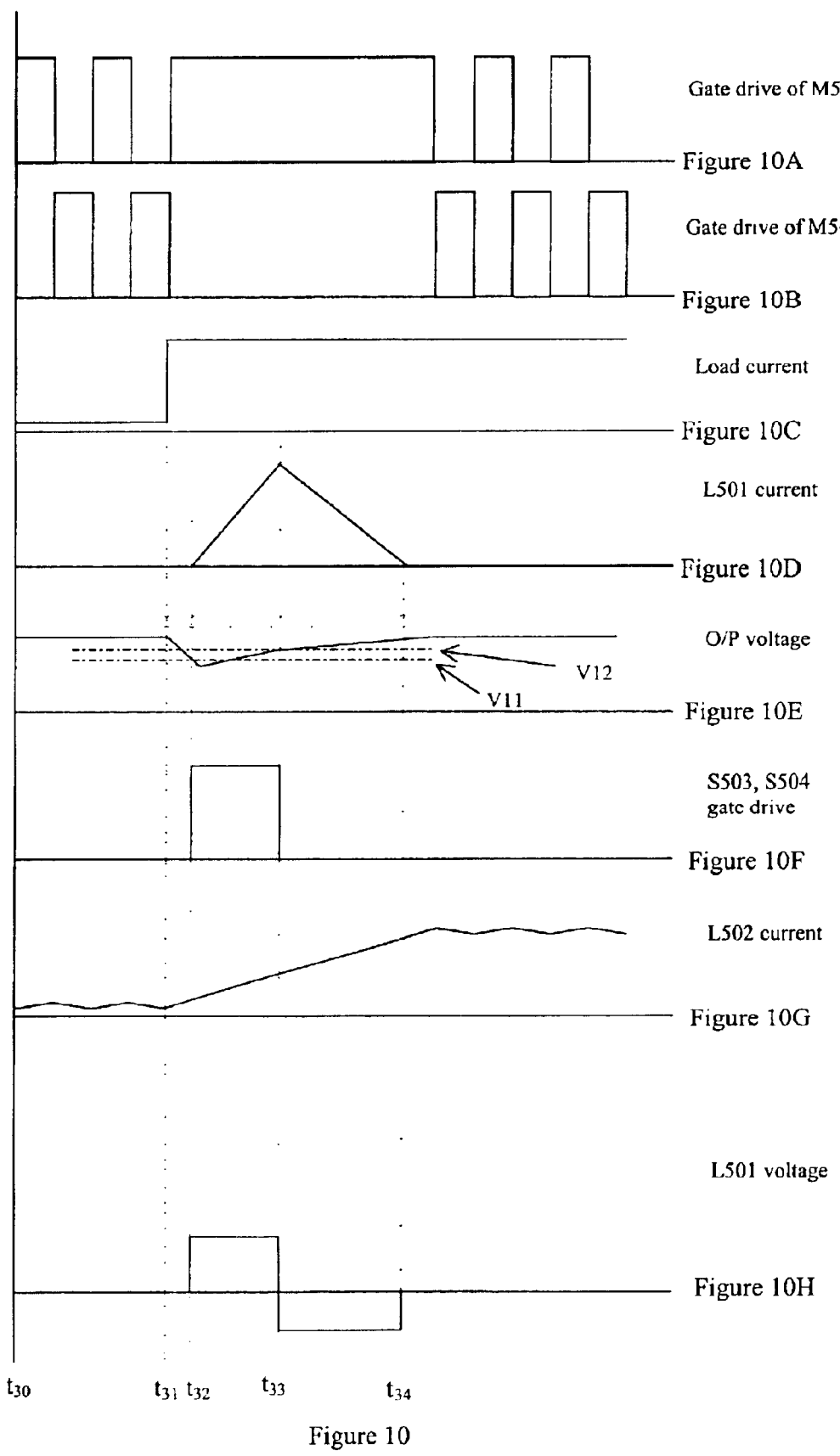
FIG. 10 illustrate waveforms for the fifth embodiment during transient load current increase.

When there is a fast transient increase in load current, the present converter tackles the transient illustrated by waveforms illustrated in FIG. 10. In the period between t30 and t31 the converter operates in steady state. At time t31 there is a step increase in load current as illustrated in FIG. 10C. This leads to an output voltage drop, as illustrated in FIG. 10E. Even under the assumption that feedback circuit 504 and PWM controller 506 is fast enough to turn on MOSFET M501 and turn off MOSFET M502, the current increase in L502 is still too slow because of its high inductance. When the voltage drops below a threshold level Vi1, switches S503, S504 are switched on by the apparatus B501, B502, IC504 and IC505. Inductor L501 which has smaller inductance is connected in parallel with inductor L502. This reduces the overall converter inductance and the current can increase rapidly as illustrated in FIG. 10D. During the time period between t32 and t33 the current increases through inductor L501. This current increase raises the output voltage until it reaches another voltage level V12, as illustrated in FIG. 10E at time t33. Once the voltage level V12 is reached, switches S503, S504 are turned off by the apparatus B501, B502, IC504 and IC505. Current in inductor L501 is diverted through diode D504 and decreases until time t34. At time t34 diode D504 is turned off and current through inductor L501 diminishes to zero. During the time period t32 to t34 the current in inductor L502 also increases towards a new value. If this new current value is able to sustain the output voltage from time t34 and after, the converter will resume normal Pulse Width Modulation with switches M501 and M502. If this new current value is not sufficient to sustain the output voltage, the output voltage will drop back to voltage level V11 and the whole process will be triggered again to boost up the output voltage. The mechanism so described provides fast current increase to tackle transient load current increase in switching power converters.

Figure 11:
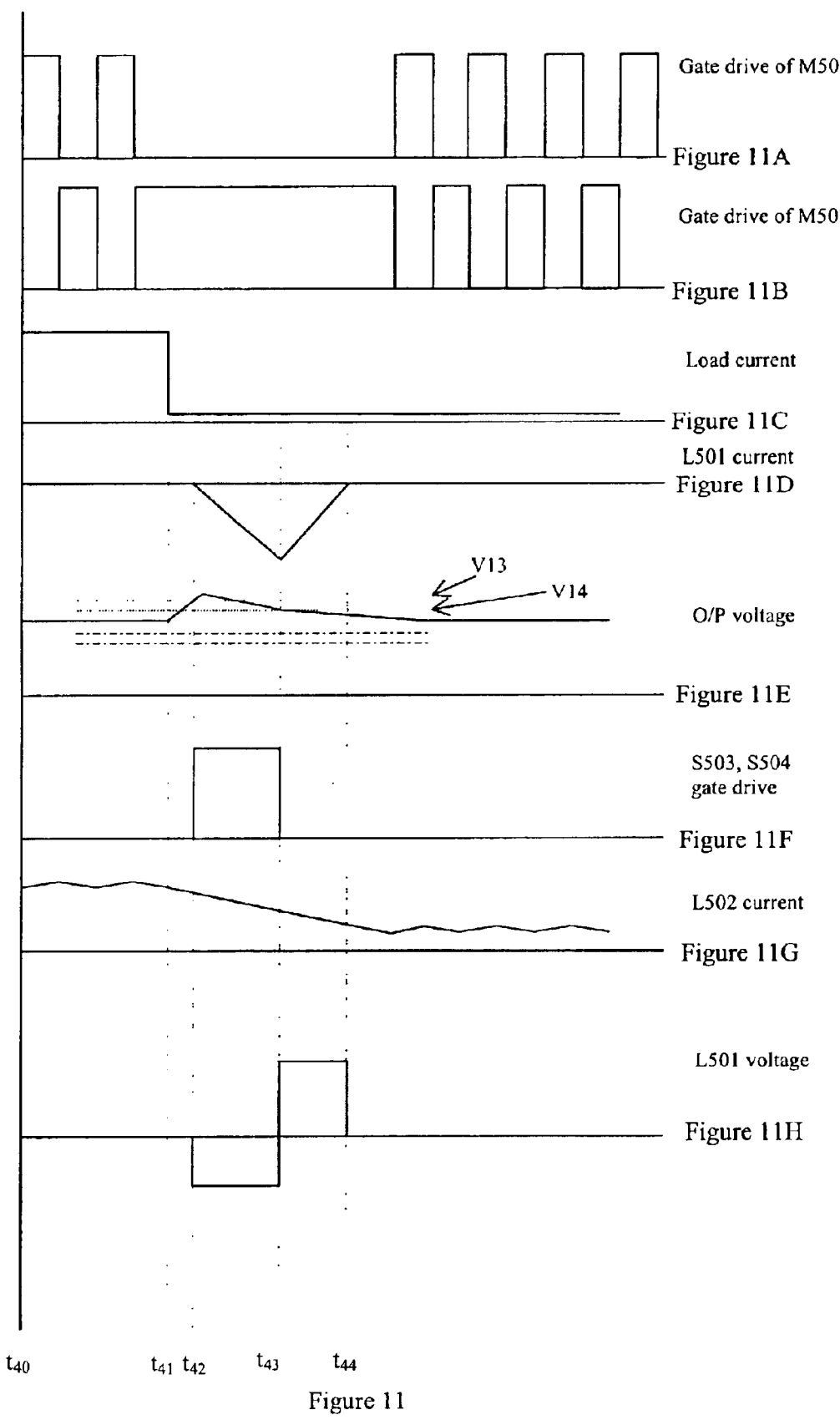
FIG. 11 illustrates waveforms for the fifth embodiment during transient load current decrease.

Operation of the circuit when there is a fast transient decrease in load current is explained in terms of the waveforms illustrated in FIG. 11. During the time period t40 to t41 the converter operates with steady load current. At time t41 the load current decreases to a low value in a step as illustrated in FIG. 1C. This causes increase in output voltage illustrated in FIG. 11E. Even under the assumption that feedback circuit 504 and PWM controller 506 are fast enough to turn off MOSFET M501 and turn on MOSFET M502, the current reduction in L502 is still slow because of its high inductance. At t42 output voltage increases and reaches a level V13 and switches S503, S504 are triggered to turn on through apparatus B501, B503 IC503 and IC505. Inductor L501, which has a much smaller inductance, is connected in parallel with inductor L502. This reduces the overall converter inductance and the current can change rapidly as illustrated in FIG. 11D. During the time period t42 to t43 the current increases in the negative sense through inductor L501. This current reduces output voltage until it reaches another voltage level V14 as illustrated in FIG. 11E at time t43. Once voltage level V14 is reached switches S503, S504 are turned off by the apparatus B501, B503, IC503 and IC505. The current in inductor L501 is diverted through diode D503 and decreases until time t44. At time t44 diode D503 is turned off and the current through inductor L501 decreases to zero. In the time period t42 to t44 the current in inductor L502 also decreases towards a new value. If this new current value is able to settle the output voltage from time t34 and after, the converter will resume normal Pulse Width Modulation with switches M501 and M502. If this new current value is not low enough to settle the output voltage, the output voltage will increase again to voltage level V13 and the whole process will be triggered again to step down the output voltage. The mechanism so described provides fast current decrease to tackle transient load current decrease in switching power converters.

In order to provide fastest transient response of the converter, a logic circuit comprising IC501, IC502, IC503, IC504, IC505 and IC506, ensure MOSFET M501 turns on under any condition when auxiliary switches S503, S504 is triggered by B502 to turn on, or to ensure MOSFET M502 turns on under any condition when auxiliary switch S503 is triggered by B503 to turn on. If switches S503 and S504 are not triggered by B503 and B502, MOSFETs M501 and MOSFET M502 will be driven by the signal from the PWM controller 506.

The present invention has been described with reference to a buck converter topology. It would be obvious, however, to one of skill in the art to apply the invention to other converter topologies including, but not limited to, a boost converter, a flyback converter, a forward converter, a push-pull converter, a resonant converter, a full bridge converter, a Cuk converter, a Sepic converter, a half bridge converter and other converter topologies, without departing from the spirit of the invention. A number of embodiments that have particular utility for fast transient applications in switching power converters have been described. However, for those skilled in the art, many more embodiments can be envisioned based on the stepping inductance principle presented, and the embodiments described herein are just a few of the embodiments that may be generated by those skilled in the art using the invention described herein. Having described in detail different embodiments of the present invention, it is to be understood that the present invention could be carried out with different elements and steps. The embodiments are presented only by way of example and are not meant to limit the scope of the present invention which is defined by the following claims.

What is claimed is:

1. A power converter comprising:
   an input for receiving input power;
   an output for providing regulated output power;
   one or more switching devices coupled to said input, wherein said one or more switching devices produce a voltage pulse train with variable pulse width for regulation of said output, and wherein said voltage pulse train also has a high voltage level and a low voltage level;
   a transformer comprising a plurality of windings, such that a first winding is coupled between said one or more switching devices and said output for conduction of current in steady state, a second winding is coupled to said input in case of a transient increase in output power, and a third winding is coupled to a low impedance in case of a transient decrease in output power; and
   a control circuit that is operable to sense voltage at the output and is also operable to couple said windings of said transformer in cases of a transient change in output power.

2. The power converter of claim 1, further comprising one or more series components in said second and third transformer winding to facilitate a change in current during a transient change.

3. The power converter of claim 2, further comprising switches in series with said second and third transformer windings for coupling to input and low impedance elements.

4. The power converter of claim 1, 2 or 3 further comprising control circuits that operate said one or more switching devices coupled to said input to produce a high voltage level in case of a transient increase in output power and a low voltage level in case of a transient decrease in output power.

5. A power converter comprising:
   an input for receiving input power;
   an output for providing regulated output power;
   One or more switching devices coupled to said input producing a voltage pulse train with variable pulse width for regulation of output, such voltage pulse train also having a high voltage level and a low voltage level;
   an inductor coupled between said one or more switching devices and said output for conduction of current in steady state;
   a transformer having a plurality of windings such that a first winding is coupled between said switching devices and output, a second winding is coupled to said input in case of a transient increase in output power, and a third winding is coupled to a low impedance in case of a transient decrease in output power; and
   a control circuit that is operable to sense voltage at the output and is also operable to couple said windings of said transformer in cases of transient change in output power.

6. The power converter of claim 5 further comprising one or more series components in said second and third transformer winding to facilitate a change in current during a transient change.

7. The power converter of claim 6 further comprising switches in series with said second and third transformer windings for coupling to input and low impedance elements.

8. The power converter of claim 5, 6 or 7 further comprising additional control circuits that operate said one or more switching devices coupled to said input to produce a high voltage level in case of a transient increase in output power and a low voltage level in case of a transient decrease in output power.

9. A power converter comprising:
   an input for receiving input power;
   an output for providing regulated output power;
   an isolated DC to AC converter producing a voltage pulse train with variable pulse width for regulation of output and such voltage pulse train also having a high voltage level and a low voltage level;
   a transformer having a plurality of windings such that a first winding is coupled between said DC to AC converter output for conduction of current in steady state, a second winding coupled to a low impedance element in case of a transient increase in output power, and a third winding coupled to a low impedance element in case of a transient decrease in output power; and
   a control circuit that is operable to sense voltage at the output and is also operable to couple said windings of said transformer in cases of transient change in output power.

10. The power converter of claim 9 further comprising one or more series components in said second and third winding to facilitate a change in current during a transient change.

11. The power converter of claim 9 further comprising one or more switches in series with said second and third winding for coupling to said low impedance element.

12. The power converter of claim 11 further comprising additional control circuits such that in the case of a transient increase in output power said series switches will simultaneously turn on when the DC-AG converter produces a high voltage pulse, whereas in the case of a transient decrease in output power said series switches will simultaneously turn on when the DC-AC converter produces a low voltage pulse.

13. A power converter comprising:

an input for receiving input power;

an output for providing regulated output power;

one or more switching devices coupled to said input producing a voltage pulse train with variable pulse width for regulation of output and such voltage pulse train also having a high voltage level and a low voltage level;

a first inductor coupled between said switching devices and said output for conduction of current in steady state;

a second inductor coupled to a series switch, said series switch having a first end and a second end, said second inductor and series switch coupled in parallel with said first inductor wherein such second inductor has an inductance much smaller than that of the first inductor, and wherein said first end is coupled to said second inductor and said second end is coupled to said output;

a control circuit that is operable to sense voltage at the output and is also operable to operate said series switch in cases of transient change in output power;and protective circuits that capture voltage overshoots produced by said second inductor during transient changes.

14. The power converter of claim 13 further comprising additional control circuits that operate power converter switching devices coupled to input to produce a high voltage level in case of a transient increase in output power and a low voltage level in case of a transient decrease in output power.

* * * * *